(12) United States Patent
Uehara et al.

(10) Patent No.: US 8,834,044 B2
(45) Date of Patent: Sep. 16, 2014

(54) INTERCHANGEABLE LENS

(71) Applicant: Canon Kabushiki Kaisha, Tokyo (JP)

(72) Inventors: Toshiyuki Uehara, Tokyo (JP);
Kousuke Kiyamura, Kawasaki (JP);
Mitsuhiro Izumi, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/706,471

(22) Filed: Dec. 6, 2012

(65) Prior Publication Data
US 2013/0148954 A1    Jun. 13, 2013

(30) Foreign Application Priority Data

Dec. 8, 2011 (JP) ................................. 2011-269325

(51) Int. Cl.
*G03B 17/00* (2006.01)
*G03B 17/14* (2006.01)

(52) U.S. Cl.
CPC ...................................... *G03B 17/14* (2013.01)
USPC .......................................... 396/529; 359/825

(58) Field of Classification Search
CPC .............. G03B 3/00; G03B 3/02; G03B 3/10;
G03B 3/12; G03B 13/32; G03B 13/34;
G03B 13/36; G03B 2205/00; G03B
2205/0046; G03B 2205/0053; G03B
2205/0061; G03B 2205/0069; G03B
2205/0076; G03B 2205/0084; G03B 2217/002
USPC ................................... 396/532, 529; 359/825
See application file for complete search history.

(56) References Cited

U.S. PATENT DOCUMENTS

| | | | | | |
|---|---|---|---|---|---|
| 4,690,537 | A | * | 9/1987 | Ando | ............................... 396/93 |
| 4,787,720 | A | * | 11/1988 | Fukita et al. | ................... 359/700 |
| 6,040,951 | A | * | 3/2000 | Kashiwaba | .................... 359/823 |
| 2003/0210478 | A1 | * | 11/2003 | Suzuki | .......................... 359/819 |
| 2008/0043351 | A1 | | 2/2008 | Hirakawa | |
| 2010/0060777 | A1 | * | 3/2010 | Yumiki | .......................... 348/340 |
| 2012/0069459 | A1 | * | 3/2012 | Ito et al. | ........................ 359/823 |

FOREIGN PATENT DOCUMENTS

JP    2008-046482 A    2/2008

\* cited by examiner

*Primary Examiner* — Clayton E Laballe
*Assistant Examiner* — Fang-Chi Chang
(74) *Attorney, Agent, or Firm* — Rossi, Kimms & McDowell LLP

(57) ABSTRACT

The interchangeable lens includes a lens holding member holding a lens, a first supporting bar engaging with the lens holding member to guide movement of the lens holding member in an optical axis direction, a second supporting bar engaging with the lens holding member to prevent rotation of the lens holding member, the second supporting bar having a shorter length than that of the first supporting bar. The interchangeable lens further includes a mount contact provided as an electric contact in a mount portion detachably attachable to a camera body. When viewed from the optical axis direction, the first supporting bar is disposed in an area not overlapping the mount contact, and the second supporting bar is disposed in an area overlapping the mount contact, and when viewed from a direction orthogonal to the optical axis direction, part of the first supporting bar overlaps the mount contact.

9 Claims, 5 Drawing Sheets

INTERCHANGEABLE LENS

BACKGROUND OF THE INVENTION

1. Field of the Invention

The present invention relates to an interchangeable lens detachably attachable to a camera body.

2. Description of the Related Art

Interchangeable lenses detachably attachable to lens-interchangeable camera bodies such as digital cameras are required to be reduced in diameter and in thickness in an optical axis direction, as well as the camera bodies. Moreover, in order to perform good image capturing for close distance objects, the interchangeable lenses are required to be improved in their close distance optical performance including in-focus performance for the close distance objects.

Such improvement of the close distance optical performance needs good correction of variation of aberrations such as spherical aberration, field curvature and comatic aberration. Japanese Patent Laid-Open No. 2008-046482 discloses a lens apparatus employing, in order to correct aberrations well, a floating system in which its image capturing optical system is divided into two or more lens groups and these lens groups are moved for focusing at mutually different speeds by mutually different distances.

Japanese Patent Laid-Open No. 2008-046482 further discloses a cam mechanism that is a driving mechanism to move the lens groups by the mutually different distances. In the cam mechanism, cam pins provided to the lens groups engage with a straight groove portion formed in a fixed barrel and cam groove portions formed for the respective lens groups in a cam ring. The cam groove portions have mutually different cam lift amounts for a same rotation amount of the cam ring. Rotation of the cam ring with respect to the fixed barrel causes the cam groove portions having such mutually different cam lift amounts to move the cam pins and thereby moves the lens groups in an optical axis direction by mutually different distances.

However, when the above-mentioned cam mechanism is used for the floating system, the cam pins are arranged far away from one another in the optical axis direction, so that a length in the optical axis direction of the cam ring provided with the cam groove portions with which the cam pins are engaged becomes long. Such a long length of the cam ring increases an entire length of the lens apparatus, which makes it impossible to reduce a thickness of the lens apparatus.

The thickness can be reduced by increasing a diameter of the cam ring to overlap areas in which the respective cam groove portions are formed in the optical axis direction as much as possible. However, the increase of the diameter of the cam ring increases a diameter of the lens apparatus.

Thus, use of the cam mechanism as a mechanism moving the lens groups in the floating system lens apparatus makes it difficult to satisfy the requirement of reduction in diameter and thickness of the lens apparatus.

SUMMARY OF THE INVENTION

The present invention provides a interchangeable lens using a floating system that moves lenses (lens groups) by mutually different distances, having good close distance optical performance and being capable of achieving reduction in diameter and thickness.

The present invention provides as one aspect thereof an interchangeable lens detachably attachable to a camera body. The interchangeable lens includes a lens holding member holding a lens, a first supporting bar engaging with the lens holding member to guide movement of the lens holding member in an optical axis direction in which an optical axis extends, a second supporting bar engaging with the lens holding member to prevent rotation of the lens holding member about the first supporting bar, the second supporting bar having a shorter length in the optical axis direction than that of the first supporting bar; and a mount contact provided as an electric contact in a mount portion detachably attachable to the camera body. When viewed from the optical axis direction, the first supporting bar is disposed in an area not overlapping the mount contact and the second supporting bar is disposed in an area overlapping the mount contact, and when viewed from a direction orthogonal to the optical axis direction, part of the first supporting bar overlaps the mount contact.

The present invention provides as another aspect thereof an interchangeable lens detachably attachable to a camera body. The interchangeable lens includes a first lens holding member holding a first lens, a second lens holding member holding a second lens, a cam ring provided with a first cam and a second cam respectively engaging with cam followers provided in the first and second lens holding members, the cam ring being rotated around an optical axis to move the first and second lens holding members in an optical axis direction in which the optical axis extends, a first supporting bar engaging with the second lens holding member to guide movement of the second lens holding member in the optical axis direction, one end of the first supporting bar being held by the first lens holding member, a second supporting bar engaging with the second lens holding member to prevent rotation of the second lens holding member about the first supporting bar, the second supporting bar having a shorter length in the optical axis direction than that of the first supporting bar, and one end of the second supporting bar being held by the first lens holding member, and a mount contact provided as an electric contact in a mount portion detachably attachable to the camera body. When viewed from the optical axis direction, the first supporting bar is disposed in an area not overlapping the mount contact and the second supporting bar is disposed in an area overlapping the mount contact, and when viewed from a direction orthogonal to the optical axis direction, part of the first supporting bar overlaps the mount contact.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 2:
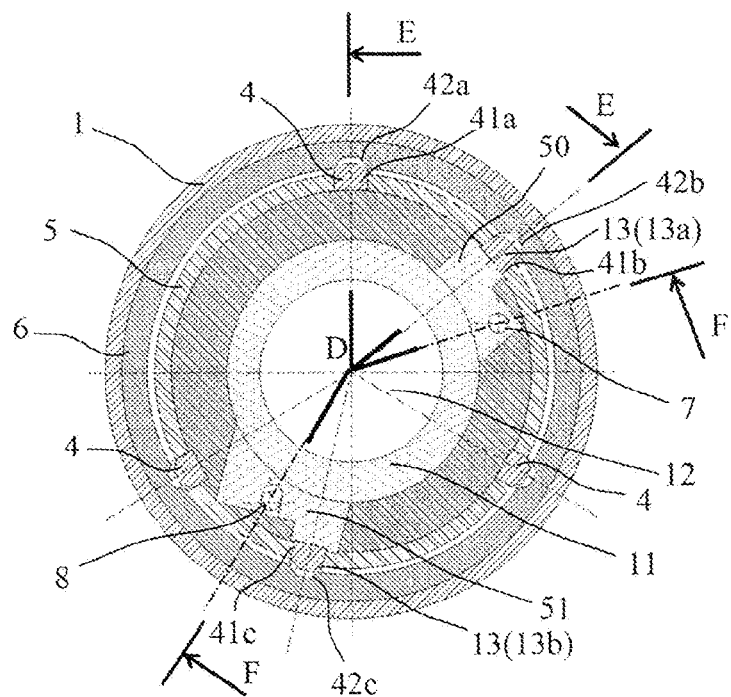
FIG. 2 is a sectional view of the interchangeable lens (cut along a B-B line in FIG. 3) of the embodiment.
Figure 3:
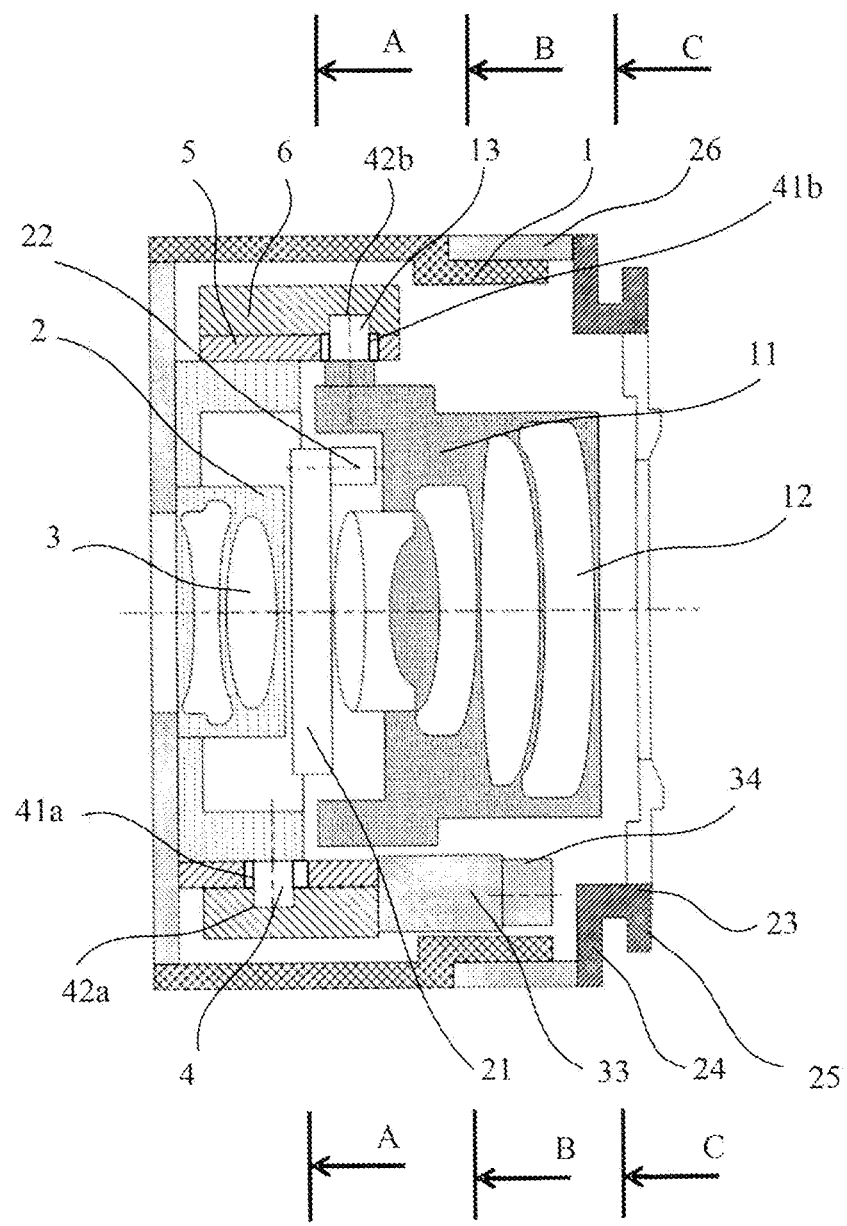
FIG. 3 is a sectional side view of the interchangeable lens (cut along an E-D-E line in FIG. 2) of the embodiment.
Figure 4:
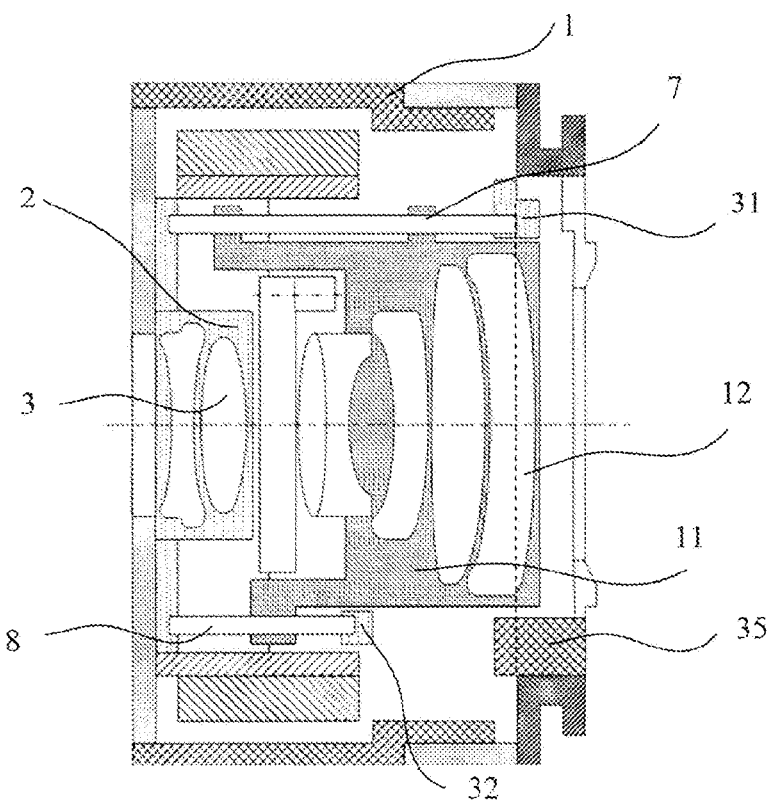
FIG. 4 is a sectional side view of the interchangeable lens (cut along an F-D-F line in FIG. 2) of the embodiment.
Figure 8:
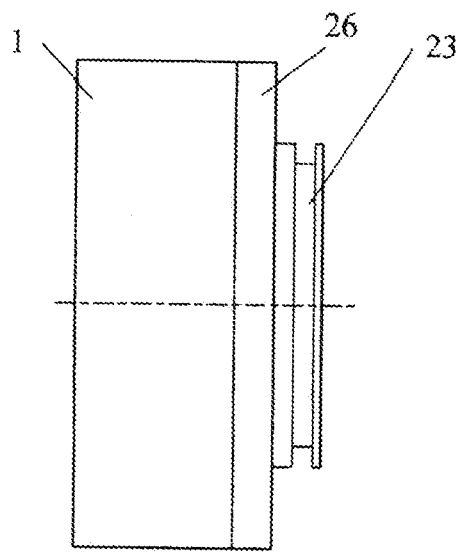
FIG. 8 is an external side view of the interchangeable lens of the embodiment.
Figure 9:
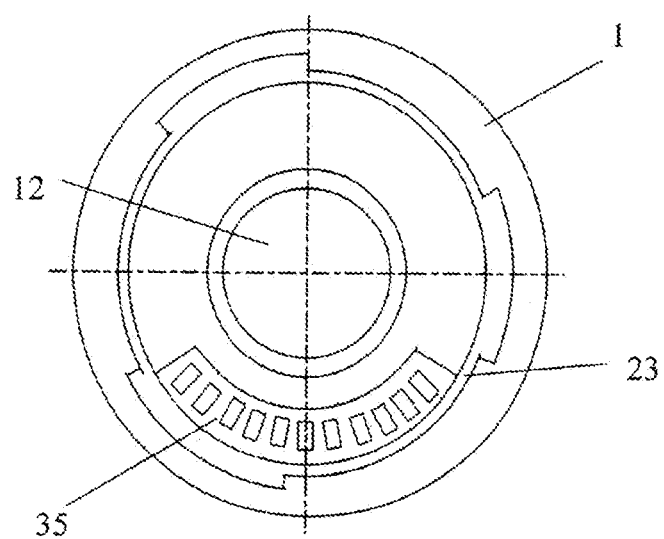
FIG. 9 is an external side view of the rear part of the interchangeable lens of the embodiment.

FIGS. 3 and 4 show a configuration of an interchangeable lens that is an embodiment of the present invention. FIGS. 3 and 4 show sections at mutually different circumferential positions (that is, positions in a direction around an optical axis) of the interchangeable lens. Moreover, FIGS. 1, 2 and 5 respectively show sections along an A-A line, a B-B line and a C-C line in FIG. 3 when viewed from a rear side (image side) of an optical axis direction. FIGS. 8 and 9 respectively show side and rear external views of the interchangeable lens.

As shown in FIGS. 3 and 4, a first lens barrel (first lens holding member) 2 holding a first lens group (first lens) 3 constituted by two lenses is disposed in a front part (object side part) inside a lens barrel main body 1. At a rear part (image side part) further rear than the first lens barrel 2 inside the lens barrel main body 1, a second lens barrel (second lens holding member) 11 holding a second lens group (second lens) 12 constituted by five lenses is disposed. An aperture stop unit 21 is disposed between the first and second lens groups 3 and 12.

Figure 1:
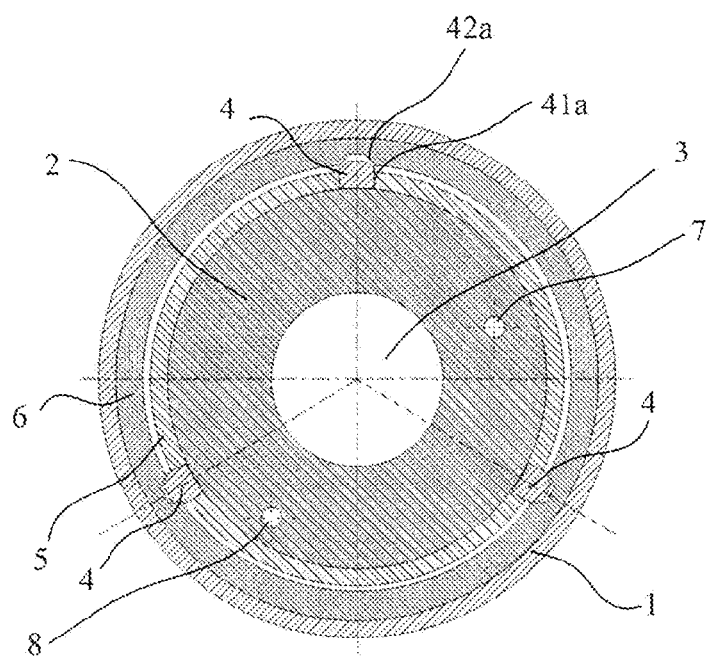
FIG. 1 is a sectional view of a interchangeable lens (cut along an A-A line in FIG. 3) that is an embodiment of the present invention.
Figure 6:
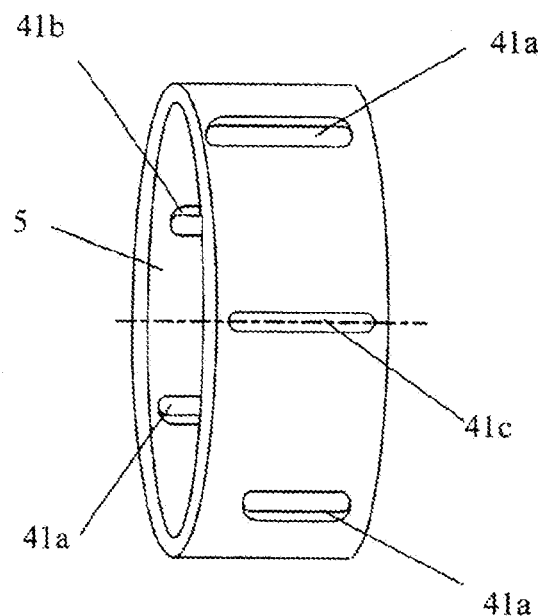
FIG. 6 is a perspective view showing a fixed barrel used in the interchangeable lens barrel of the embodiment.
Figure 7:
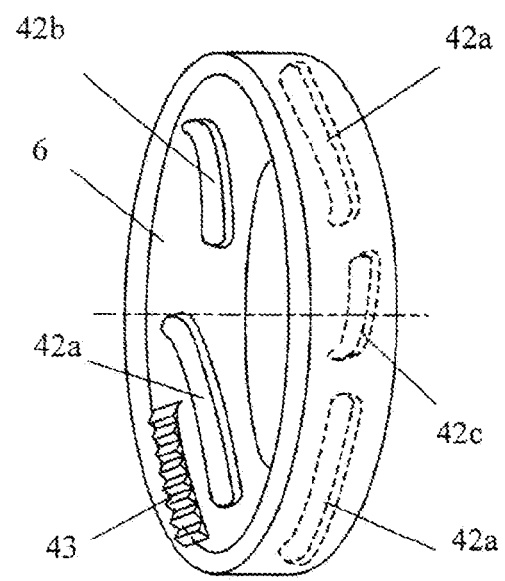
FIG. 7 is a perspective view showing a cam ring used in the interchangeable lens of the embodiment.

As shown in FIGS. 3 and 1, three first cam pins (first cam followers) 4 are provided in an outer circumferential part of the first lens barrel 2 at an equal interval in the circumferential direction. These three first cam pins 4 respectively engage with three first straight groove portions 41a formed in a fixed barrel 5 so as to extend in the optical axis direction. The fixed barrel 5 is fixed inside the lens barrel main body 1. The three first cam pins 4 further respectively engage with three first cam groove portions (first cams) 42a formed in a cam ring 6 disposed outside the fixed barrel 5 and rotatable around the optical axis with respect to the fixed barrel 5. FIG. 6 shows whole of the fixed barrel 5. FIG. 7 shows whole of the cam ring 6.

Rotation of the cam ring 6 causes cam lifts (slopes) of the three cam groove portions 42a to move the three first cam pins 4 in the optical axis direction, which moves the first lens barrel 2 (that is, the first lens group 3) in the optical axis direction.

The first straight groove potions 41a engaging with the first cam pins 4 have a role of preventing rotation of the first lens barrel 2 in the direction around the optical axis and guiding the first lens barrel 2 straight in the optical axis direction. Guiding the first lens barrel 2 by these three pairs of the first cam pin 4 and the first straight groove portion 41a enables provision of good straight movement accuracy of the first lens barrel 2.

Moreover, as shown in FIGS. 4 and 2, in an outer circumferential part of the second lens barrel 11, a second main cam pin 13a and a second sub cam pin 13b as second cam followers are provided. These cam pins 13a and 13b are hereinafter also collectively referred to as "second cam pins 13". The second main cam pin 13a and the second sub cam pin 13b respectively engage with a second main straight groove portion 41b and a second sub straight groove portion 41c (hereinafter also collectively referred to as "second straight groove portions") formed in the fixed barrel 5 so as to extend in the optical axis direction.

The second main cam pin 13a and the second sub cam pin 13b further respectively engage with a second main cam groove portion 42b and a second sub cam groove portion 42c (hereinafter also collectively referred to as "second cam groove portions" as second cams) formed in the cam ring 6. When viewed from the optical axis direction, the second cam pins 13 are located different positions from those on lines connecting the optical axis and the first cam pins 4.

The second sub cam pin 13b has a smaller outer diameter than that of the second main cam pin 13a. The second sub cam pin 13b is brought into contact to the second sub cam groove portion 42c only when the second lens barrel 11 receives some load to be tilted or distorted, which prevents the second main cam pin 13a from disengaging from the second main cam groove portion 42b.

Rotation of the cam ring 6 causes a cam lift of the second main cam groove portion 42b to move the second main cam pin 13a in the optical axis direction, which moves the second lens barrel 11 (that is, the second lens group 12) in the optical axis direction.

The two second straight groove potions 41b and 41c engaging with the second cam pins 13 have a role of preventing rotation of the second lens barrel 11 in the direction around the optical axis and guiding the second lens barrel 11 straight in the optical axis direction.

Moreover, as shown in FIG. 4, the second lens barrel 11 is provided with a main guide bar engaging portion (first bar engaging portion) 50 and a sub guide bar engaging portion (second bar engaging portion) 51. The main guide bar engaging portion 50 engages at its circular hole portion with a main guide bar (first supporting bar) 7 extending in the optical axis direction so as to be movable in the optical axis direction. The sub guide bar engaging portion 51 engages at its groove portion, such a U-shaped groove portion, with a sub guide bar (second supporting bar) 8 extending in the optical axis direction so as to be movable in the optical axis direction.

The second main cam pin 13a is provided at an outer circumferential face of the main guide bar engaging portion 50 including the circular hole portion. The circular hole portion is formed near the second main cam pin 13a. The main guide bar engaging portion 50 prevents, together with the second main cam pin 13a, tilting of the second lens barrel 11 with respect to a plane orthogonal to the optical axis. The second sub cam pin 13b is provided at an outer circumferential face of the sub guide bar engaging portion 51 including the U-shaped groove portion. The U-shaped groove portion is formed near the second sub cam pin 13b. The sub guide bar engaging portion 51 prevents rotation of the second lens barrel 11 about the main guide bar 7.

Figure 5:
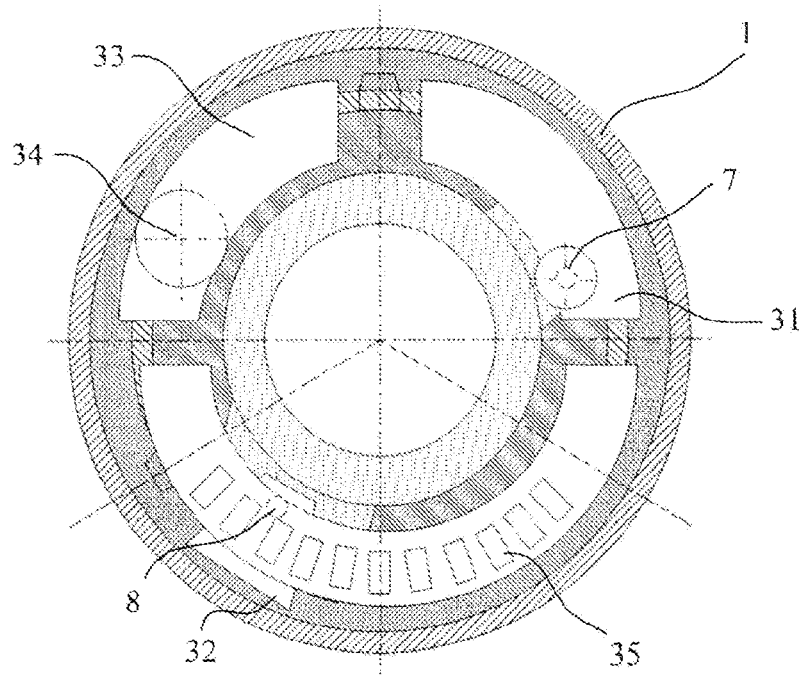
FIG. 5 is a sectional view of the interchangeable lens (cut along a C-C line in FIG. 3) of the embodiment, showing an internal configuration of a rear part of thereof.

As shown in FIGS. 4 and 1, front ends (one ends) of the main and sub guide bars 7 and 8 are held by bar holding portions formed in an outer circumferential portion of the first lens barrel 2: in the first lens barrel 2 the outer circumferential portion is formed so as to extending outward in a direction orthogonal to the optical axis from a front end portion (lens holding portion) holding the first lens group 3. As shown in FIGS. 4 and 5, a main guide bar fixing member 31 and a sub guide bar fixing member are provided at positions away rearward from the front lens holding part of the first lens barrel 2. These main and sub guide bar fixing members 31 and 32 are integrally provided in the first lens barrel 2 by being formed by integral molding together with the first lens barrel 2 or by being fixedly attached to the first lens barrel 2 with screws or adhesive. The main and sub guide bar fixing members 31 and 32 hold rear ends of the main and sub guide bars 7 and 8.

Since both the main and sub guide bar fixing members 31 and 32 are thus integrally provided in the first lens barrel 2, they can be regarded as part of the first lens barrel 2.

The main guide bar 7 has a longer length in the optical axis direction than that of the sub guide bar 8, and extends in the optical axis direction from the front end portion of the first lens barrel 2 to a position near a mount portion 23. As shown in FIG. 4, when viewed from the direction orthogonal to the optical axis direction, a rear part of the main guide bar 7 overlaps a mount contact 35 described later. This overlap provides an engagement length in the optical axis direction of the main guide bar 7 and the second lens barrel 11 as long as possible in order to prevent tilting of the second lens barrel 11. On the other hand, the sub guide bar 8 having a shorter length in the optical axis direction than that of the main guide bar 7 prevents rotation of the second lens barrel 11 about the main guide bar 7.

Guiding the second lens barrel 11 by the two pairs of the second cam pin 13 and the second straight groove portion (41b and 41c) and further by the two guide bars 7 and 8 enables provision of good straight movement accuracy of the second lens barrel 11.

The aperture stop unit 21 increases and decreases its aperture diameter by moving stop blades in open and close directions by a stop motor 22 to control quantity of light.

As shown in FIG. 3, a focus driving gear box as a cam ring driving mechanism including a focus motor 34 as a driving source actuator is fixed to the fixed barrel 5. The focus driving gear box 33 decelerates rotation from the focus motor 34 to transmit rotational force therefrom to an internally-toothed gear 43 formed in the cam ring 6 as shown in FIG. 7 to rotate the cam ring 6. The rotation of the cam ring 6 moves the first lens group 3 and the second lens group 12 in the optical axis direction, and thereby focus operation (focus drive) is performed.

A manual focus ring 26 as an operation member is attached to an outer circumferential portion of the rear part of the lens barrel main body 1 so as to be rotatable around the optical axis. User's rotational operation of the manual focus ring 26 causes the focus driving gear box 33 (focus motor 34) to perform the focus drive. The manual focus ring 26 is an electronic operation member (electronic ring) configured to have no rotation end, that is, to be infinitely rotatable.

Moreover, the camera body produces a focus control signal in response to an ON operation of a shutter button provided therein. The interchangeable lens receives the focus control signal from the camera body through the mount contact 35 described later, and drives the focus motor 34 according to the focus control signal. Thereby, auto focus capable of automatically providing an in-focus state is performed.

As shown in FIGS. 3, 4, 8 and 9, at a rear end of the lens barrel main body 1, the mount portion 23 that is detachably attachable to the camera body is attached. A rear end surface of an outermost circumferential part of the mount portion 23 is a reference surface (mount reference surface) 24 for attaching the interchangeable lens to the camera body. Bayonet claws 25 formed in the mount portion 23 engage with bayonet claws provided in a mount portion of the camera body when the interchangeable lens is attached to the camera body. This engagement of the bayonet claws enables stable coupling of the interchangeable lens with the camera body.

Furthermore, the mount portion 23 is provided in its partial angular area in the direction around the optical axis with the mount contact 35 including two or more electric contacts. The mount contact 35 includes communication contacts enabling communication of various signals (including the above-mentioned focus control signal) and data between the interchangeable lens and the camera body and a power supply contact through which electric power is supplied from the camera body to the interchangeable lens.

For a same rotation amount of the cam ring 6, a cam lift amount of the second main cam groove portion 42b is different from that of the first cam groove portion 42a. Thus, movement amounts (distances) of the first and second lens barrels 2 and 11 for the same rotation amount of the cam ring 6 are mutually different. Thus, a floating system interchangeable lens is configured in which rotation of the common cam ring 6 moves the first and second lens barrels 2 and 11 at mutually different speeds by mutually different distances. Such a floating system makes it possible to ensure close distance optical performance capable of providing an in-focus state for a close distance object in a state where aberrations are corrected well.

As shown in FIG. 5, in the interchangeable lens of this embodiment, the main guide bar fixing member 31, the focus driving gear box 33 and the mount contact 35 are arranged in areas not overlapping one another (that is, in mutually different areas) when viewed from the optical axis direction. This arrangement enables reduction in length of the lens barrel main body 1 in the optical axis direction, thereby achieving reduction in thickness of the interchangeable lens.

Moreover, as described above, the main guide bar 7 is formed so as to have a long length extending from the front end portion of the first lens barrel 2 to the position near the mount portion 23. On the other hand, the sub guide bar 8 has a shorter length than that of the main guide bar 7 because the sub guide bar 8 is a member to prevent the rotation of the second lens barrel 11. Thus, in this embodiment, as shown in FIG. 5, the sub guide bar fixing member 32 is disposed in an area overlapping the mount contact 35 when viewed from the optical axis direction. This disposition prevents increase in diameter of the lens barrel main body 1, which enables miniaturization (reduction in diameter) of the interchangeable lens.

Furthermore, in this embodiment, the second lens barrel 11 is movably supported by a cam mechanism including the two second cam pins 13 (13a and 13b) and the two second cam groove portions 42b and 42c and by a bar supporting mechanism including the main and sub guide bars 7 and 8. The number (two) of the second cam pins 13 and the two second cam groove portions 42b and 42c is smaller than three, and it may be one. This configuration enables reduction in total number of the cam groove portions (42a, 42b and 42c) that should be formed in the cam ring 6 for the first and second lens groups 2 and 12, which results in reduction in diameter of the cam ring 6. In addition, overlapping areas where the first and second cam groove portions 42a, 42b and 42c in the optical axis direction as much as possible enables reduction in distance in the optical axis direction between the first and second lens barrels 2 and 11, which can achieve reduction in thickness of the interchangeable lens.

As described above, this embodiment enables reduction in diameter and thickness of the floating system interchangeable lens capable of moving a plurality of lens groups at mutually different speeds by mutually different distances while ensuring good close distance optical performance.

Although this embodiment described the interchangeable lens including two lens groups (lens holding members), alternative embodiments of the present invention include interchangeable lenses provided with three or more lens groups. In such a case, two of the three or more lens groups may be treated as the first and second lens groups.

Moreover, although this embodiment described the case of moving the first and second lens barrels 2 and 11 for focusing, these lens barrels may be moved for zooming (variation of magnification).

Furthermore, although this embodiment described the case where the cam pins 4, 13a and 13b provided in the first and second lens barrels 2 and 11 engage with the cam groove portions 42a, 42b and 42c formed in the cam ring 6, another configuration may be employed in which cam protrusions are provided in the cam ring engage with the cam followers provided in the lens holding member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-269325, filed on Dec. 8, 2011, which is hereby incorporated by reference herein in its entirety.

What is claimed is:

1. An interchangeable lens detachably attachable to a camera body, the interchangeable lens comprising:
   a mount portion detachably attachable to the camera body;
   a lens holding member holding a lens and having a cam follower;
   a first supporting bar engaging with the lens holding member to guide movement of the lens holding member in an optical axis direction in which an optical axis extends;
   a second supporting bar engaging with the lens holding member to prevent rotation of the lens holding member about the first supporting bar, the second supporting bar having a shorter length in the optical axis direction than that of the first supporting bar;
   a cam ring provided with a cam engaging with the cam follower, the cam ring being rotatable around the optical axis to move the lens holding member;
   a cam ring driver disposed on a mount portion side farther than the cam ring and including an actuator and a mechanism to rotate the cam ring by transmitting thereto a driving force from the actuator;
   a mount contact provided as an electric contact in the mount portion,
   wherein, when viewed from the optical axis direction, the first supporting bar is disposed in an area not overlapping the cam ring driver and the mount contact, the cam ring driver and the mount contact are respectively disposed in areas not overlapping each other, and the second supporting bar is disposed in an area overlapping the mount contact, and
   wherein, when viewed from a direction orthogonal to the first supporting bar, part of the first supporting bar overlaps the cam ring driver and the mount contact.

2. A camera system comprising:
   a camera body; and
   an interchangeable lens according to claim 1, which is detachably attachable to the camera body.

3. An interchangeable lens detachably attachable to a camera body, the interchangeable lens comprising:
   a mount portion detachably attachable to the camera body;
   a first lens holding member holding a first lens and having a first cam follower;
   a second lens holding member holding a second lens and having a second cam follower;
      a first supporting bar engaging with the second lens holding member to guide movement of the second lens holding member in an optical axis direction in which an optical axis extends, one end of the first supporting bar being held by the first lens holding member;
   a second supporting bar engaging with the second lens holding member to prevent rotation of the second lens holding member about the first supporting bar, the second supporting bar having a shorter length in the optical axis direction than that of the first supporting bar, and one end of the second supporting bar being held by the first lens holding member;
   a cam ring provided with a first cam and a second cam respectively engaging with the first and second cam followers, the cam ring being rotatable around an optical axis to move the first and second lens holding members in an optical axis direction in which the optical axis extends;
   a cam ring driver disposed on a mount portion side farther than the cam ring and including an actuator and a mechanism to rotate the cam ring by transmitting thereto a driving force from the actuator; and
   a mount contact provided as an electric contact in the mount portion,
   wherein, when viewed from the optical axis direction, the first supporting bar is disposed in an area not overlapping the cam ring driver and the mount contact, the cam ring driver and the mount contact are respectively disposed in areas not overlapping each other, and the second supporting bar is disposed in an area overlapping the mount contact, and
   wherein, when viewed from a direction orthogonal to the first supporting bar, part of the first supporting bar overlaps the cam ring driver and the mount contact.

4. An interchangeable lens according to claim 3, wherein:
   the cam ring is provided with three of the first cam and two of the second cam,
   the first lens holding member is provided with three the first cam follower respectively engaging with the three first cams, and
   the second lens holding member is provided with less than three of the second cam follower, respectively engaging with the two second cams.

5. An interchangeable lens according to claim 4, wherein the second lens holding member is provided with two of the second cam follower, one of the two second cam followers being provided in a first bar engaging portion in which a hole portion engaging with the first supporting bar is formed, and the other of the two second cam followers being provided in a second bar engaging portion in which a groove portion engaging with the second supporting bar is formed.

6. An interchangeable lens according to claim 5, wherein, when viewed from the optical axis direction, the other second cam follower is located at different positions from those on a line connecting the optical axis and the one second cam follower.

7. A camera system comprising:
   a camera body; and
   an interchangeable lens according to claim 3, which is detachably attachable to the camera body.

8. An interchangeable lens detachably attachable to a camera body, the interchangeable lens comprising:
   a mount portion detachably attachable to the camera body;
   a lens holding member holding a lens and having a cam follower;
   a first supporting bar engaging with the lens holding member to guide movement of the lens holding member in an optical axis direction in which an optical axis extends;
   a second supporting bar engaging with the lens holding member to prevent rotation of the lens holding member about the first supporting bar, the second supporting bar having a shorter length in the optical axis direction than that of the first supporting bar;

a cam ring provided with a cam engaging with the cam follower, the cam ring being rotatable around the optical axis to move the lens holding member;

a cam ring driver disposed on a mount portion side farther than the cam ring and including an actuator and a mechanism to rotate the cam ring by transmitting thereto a driving force from the actuator; and a mount contact provided as an electric contact in the mount portion, wherein, when viewed from the optical axis direction, the first supporting bar is disposed in an area not overlapping the cam ring driver and the mount contact, the cam ring driver and the mount contact are respectively disposed in areas not overlapping each other, and the second supporting bar is disposed in an area overlapping the mount contact, and wherein, in the optical axis direction, the cam ring driver and the mount contact are disposed in a same area where part of the first supporting bar extends.

9. An interchangeable lens detachably attachable to a camera body, the interchangeable lens comprising:

a mount portion detachably attachable to the camera body;

a first lens holding member holding a first lens and having a first cam follower;

a second lens holding member holding a second lens and having a second cam follower;

a first supporting bar engaging with the second lens holding member to guide movement of the second lens holding member in an optical axis direction in which an optical axis extends, one end of the first supporting bar being held by the first lens holding member;

a second supporting bar engaging with the second lens holding member to prevent rotation of the second lens holding member about the first supporting bar, the second supporting bar having a shorter length in the optical axis direction than that of the first supporting bar, and one end of the second supporting bar being held by the first lens holding member;

a cam ring provided with a first cam and a second cam respectively engaging with the first and second cam followers, the cam ring being rotatable around an optical axis to move the first and second lens holding members in an optical axis direction in which the optical axis extends;

a cam ring driver disposed on a mount portion side farther than the cam ring and including an actuator and a mechanism to rotate the cam ring by transmitting thereto a driving force from the actuator; and a mount contact provided as an electric contact in the mount portion, wherein, when viewed from the optical axis direction, the first supporting bar is disposed in an area not overlapping the cam ring driver and the mount contact, the cam ring driver and the mount contact are respectively disposed in areas not overlapping each other, and the second supporting bar is disposed in an area overlapping the mount contact, and wherein, in the optical axis direction, the cam ring driver and the mount contact are disposed in a same area where part of the first supporting bar extends.

* * * * *